Figure 1:
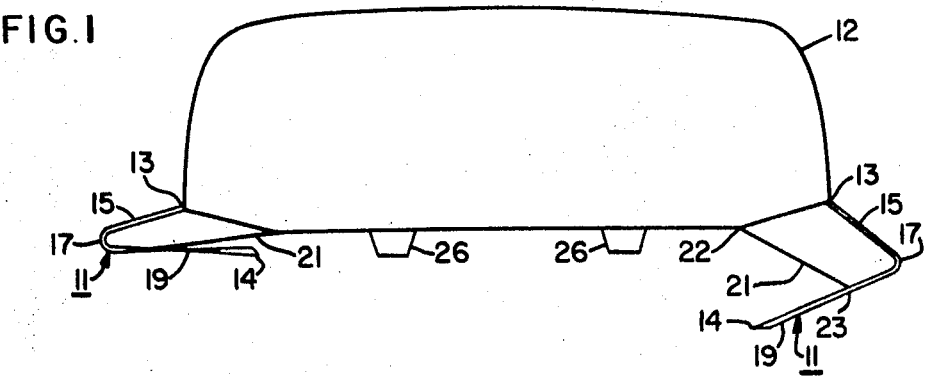

United States Patent

[11] 3,608,664

| | | |
|---|---|---|
| [72] | Inventor | Norman Ralph Taylor<br>Cowes, Isle of Wight, England |
| [21] | Appl. No. | 821,266 |
| [22] | Filed | May 2, 1969 |
| [45] | Patented | Sept. 28, 1971 |
| [73] | Assignee | British Hovercraft Corporation, Limited<br>Yeovil, Somerset, England |
| [32] | Priority | May 8, 1968 |
| [33] | | Great Britain |
| [31] | | 21,689/68 |

[54] CUSHION BARRIERS FOR AIR CUSHION VEHICLES
2 Claims, 6 Drawing Figs.

[52] U.S. Cl. ................................................ 180/127, 180/128
[51] Int. Cl. .................................................. B60v 1/16
[50] Field of Search ...................................... 180/127, 118, 128

[56] References Cited
UNITED STATES PATENTS

| | | | | |
|---|---|---|---|---|
| 3,211,246 | 10/1965 | Lewis | | 180/127 |
| 3,347,329 | 10/1967 | Jones | | 180/128 |
| 3,511,331 | 5/1970 | Landry | | 180/127 |
| 3,182,739 | 5/1965 | Cockerell | | 180/118 |
| 3,339,657 | 9/1967 | Bertin et al. | | 180/127 |
| 3,483,939 | 12/1969 | Maddock et al. | | 180/127 |

Primary Examiner—A. Harry Levy
Attorney—Larson, Taylor & Hinds

ABSTRACT: A barrier for bounding at least part of the periphery of the cushion area of an air cushion vehicle is constructed at least in part from composite materials so as to have an acutely bent cross section. The barrier comprises an upper part and a lower part connected by a resilient sharply curved part, the free edge of the upper part being adapted for attachment to the rigid structure of the vehicle. In its nonoperational state, the upper part of the barrier extends outwardly from the vehicle to merge with the sharply curved part, which curves sharply downwardly and inwardly to merge with the lower portion which extends inwardly with respect to the vehicle, terminating in a free edge. When the cushion is pressurized, the pressure on the barrier overcomes the resilience of the sharply curved part and moves the free edge of the lower part downwardly and outwardly in opposition to the normal sharply curved configuration of the resilient part. The resilience of the sharply curved part is sufficient to return the barrier to its original configuration when the cushion pressure ceases.

CUSHION BARRIERS FOR AIR CUSHION VEHICLES

This invention concerns air cushion vehicles, and more particularly the barriers for retarding the outward escape of air from the pressurized cushion area of these vehicles.

Air cushion vehicles may have flexible skirt assemblies, made and suitable flexible impermeable material, to act as barriers to the escape of the air cushion. One of the difficulties encountered with such flexible skirt assemblies is that, whenever the vehicle sets down, when the supporting cushions die away, the skirt suffers indiscriminate crumpling. This crumpling increases the breakdown of the flexible material and shortens the life of the skirt assembly. Another difficulty is that the flexible materials tend to wear rapidly in those areas of the skirt assembly which come into contact with the surface over which the vehicle travels. Materials having better wearing qualities tend to be too stiff, and if a skirt assembly was constructed entirely of metal to improve the wearing properties, the skirt assembly would be deficient in obstacle-clearing properties.

It is an object of this invention to provide an air cushion barrier which folds to a controlled configuration when the vehicle sets down and which flexes in its lower regions to substantially conform to the surface over which the vehicle is operating.

Although this invention is described with particular reference to vehicles supported on cushions of pressurized air, it is to be understood that it also applies to vehicles which are supported on cushions of other suitable gases, fluids, or combinations of the two.

According to the invention I provide a barrier for bounding at least part of the periphery of the cushion area of an air cushion vehicle, wherein the barrier has an acutely bent cross section with an upper part extending outwardly from a line of attachment at said periphery and a lower part having a free edge extending towards the cushion area, the said barrier being formed from impermeable sheet material and including a resilient sharply curved portion so as to be responsive to air cushion pressure to assume a less acutely bent shape when the free edge moves downward and the vehicle becomes air cushion supported.

From another point of view I provide a barrier for bounding at least part of the periphery of the cushion area of an air cushion vehicle, the barrier being of resilient construction and comprising an upper part extending outwardly from a line of attachment on the vehicle to a reentrant part, a lower part extending from the reentrant part beneath the upper part towards the vehicle to terminate at a free edge, so that, when the vehicle becomes air cushion supported, the free edge is extended downwardly and outwardly under the action of the air cushion pressure on the lower part, the barrier returning to its original configuration when the vehicle sets down and the air cushion pressure decays.

By characteristic term "resilient" I mean having the inbuilt characteristic of returning to its formed shape after displacement from that shape when the deflecting or displacement force is removed. This characteristic may be inherent in the material or it may be provided or assisted by elastic devices arranged to return the barrier to a desired position.

Preferably the barrier is made from composite materials which may include as their reinforcing material glass fibers, woven glass cloth, carbon fibers or other similar materials. The reinforcing material is impregnated with suitable synthetic resins or rubbers in order to give the barrier the desired characteristics.

The resilience of the curved portion of the barrier may be enhanced by the inclusion of suitably formed spring steel strip or wire, and where additional stiffness is required this may be obtained by integrally molded ribs.

Resilient means may be provided between the upper and lower parts of the barrier or between the lower part of the barrier and the rigid structure of the machine, in order to return the barrier to its original configuration when the cushion pressure decays after the vehicle has set down.

The lower part of the barrier may be detachable so that it can easily be replaced when the free edge becomes worn or damaged. At least in the region of the free edge the lower part of the barrier will be impregnated with a material which will impart a high degree of flexiblity to this area, in order that the free edge can easily be displaced to pass over obstacles or to conform to the surface over which the vehicle is travelling. The flexibility of the lower part may be increased by molding it to a suitably fluted or corrugated form.

If desired, web or tie members may be provided between the lower part of the barrier and the rigid structure of the vehicle which limit the downward and outward movement of the free edge.

The barrier may be attached to the vehicle by suitable hinge means, and although it may be molded as one complete unit it is preferable, particularly in the case of large craft, that it is molded in a number of peripheral sections which are joined together in a suitable airtight manner.

Figure 4:
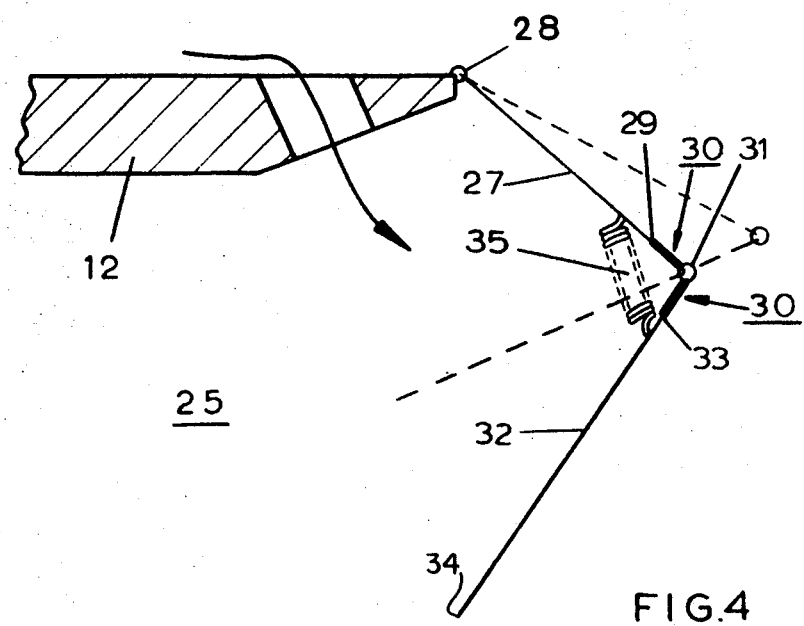
Figure 5:
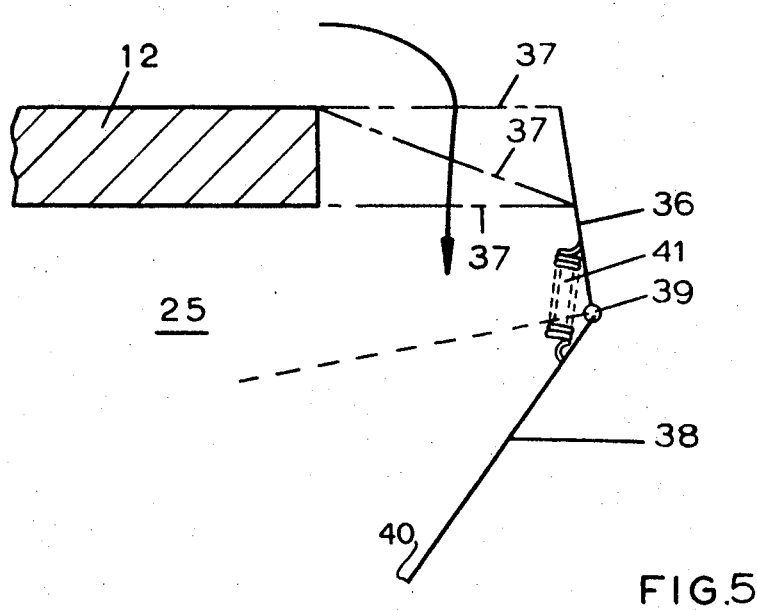
Figure 6:
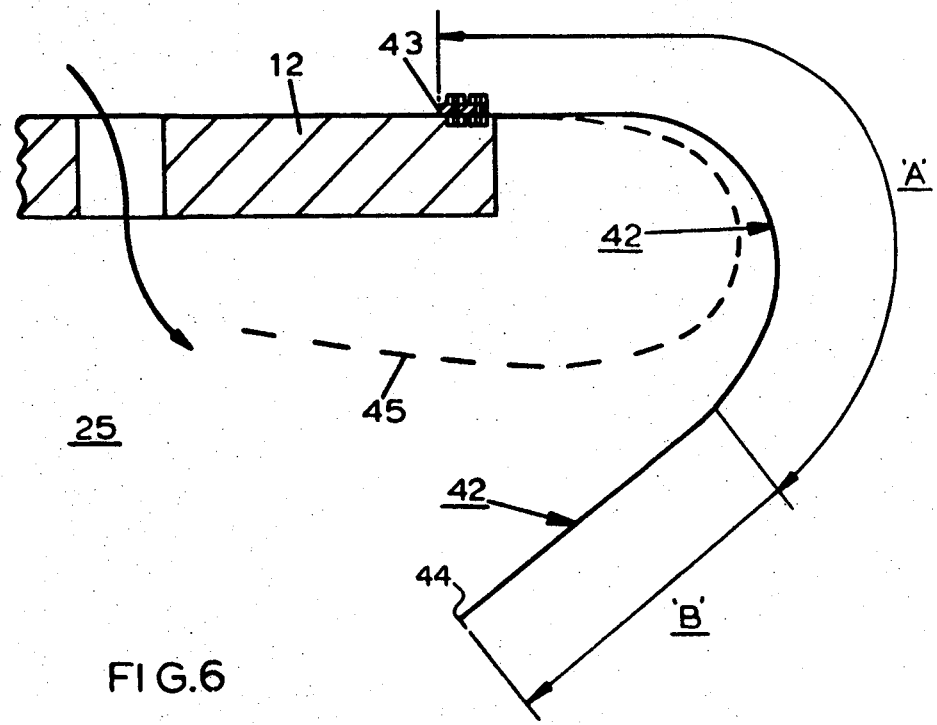

The invention will now be described by way of example, with reference to the accompanying drawings, in which:

FIG. 1 is an outline section, in a vertical plane, of an air cushion vehicle having a cushion-retaining barrier according to one embodiment of the invention. For the purpose of illustration the cushion-retaining barrier is shown in its operational extended position on one side of the vehicle, and in its folded raised position on the other side, FIG. 2 is a perspective view of part of the barrier, as shown in FIG. 1, in its folded raised position, FIG. 3 is a perspective view of that part of the barrier shown in FIG. 2 when it is in the extended operational position, FIG. 4 is a section through part of the rigid structure of a vehicle and a barrier of another embodiment of the invention, wherein resilient means are provided between the upper and lower parts of the barrier for returning the lower part of the barrier to its folded configuration and the barrier is hingedly attached to the vehicle, FIG. 5 is a section through part of the rigid structure of a vehicle and a barrier of similar form to that shown in FIG. 4, wherein the barrier is rigidly attached to the vehicle, and FIG. 6 is a section through part of the rigid structure of a vehicle and a barrier of a further embodiment of the invention, wherein the resilience required for the barrier to return to its folded position is built into the barrier and no tie means are provided to limit downward and outward movement of the free edge.

Figure 2:
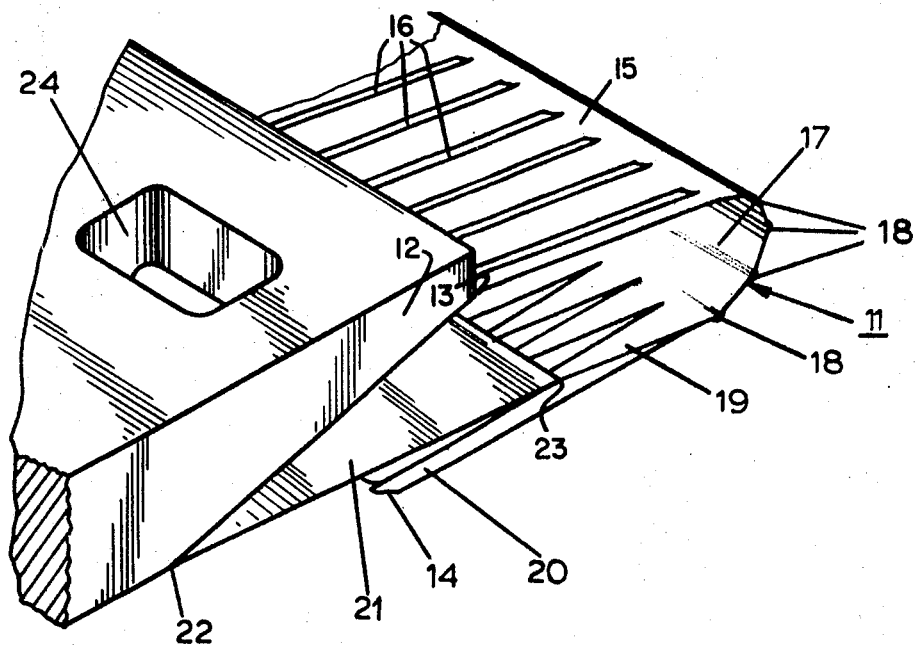
Figure 3:
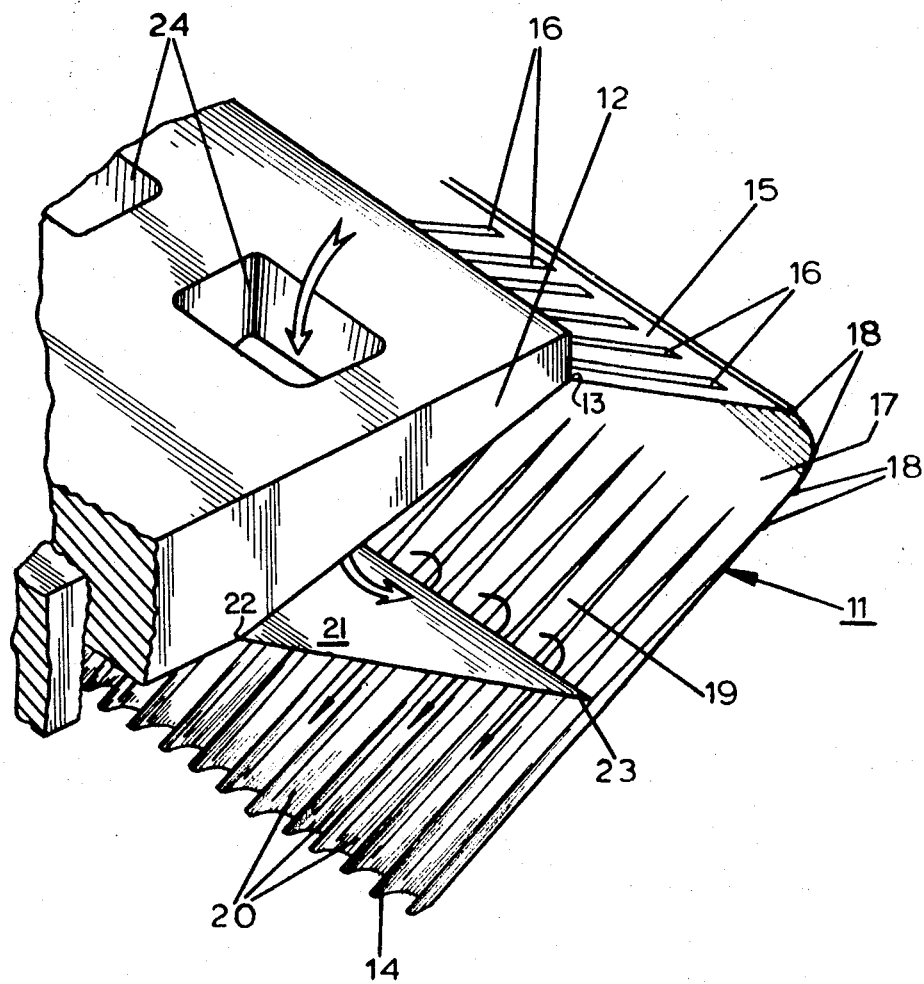

Referring first to FIGS. 1, 2 and 3, there is shown one embodiment of the invention in which a cushion-retaining barrier 11 is attached to the rigid structure 12 of an air cushion vehicle. FIG. 1 shows, in outline only, the rigid structure 12 of the body of an air cushion vehicle having bearer feet 26 on which the vehicle rests when it is not air cushion supported. The air cushion barrier 11 is attached to the vehicle at 13 by suitable hinged means. On one side of the vehicle in FIG. 1 the barrier 11 is shown in its natural folded position, to which it returns due to its built-in resilience, when it is not subjected to air cushion pressure. FIG. 2 shows in perspective part of the barrier 11 attached to rigid structure 12 when the barrier is in its natural folded position. On the other side of the vehicle in FIG. 1 the barrier 11 is shown in its extended position, which it takes up when acted upon by the pressurized air which generates and forms the air cushion when the vehicle becomes operational. Part of the barrier is shown in this extended position in the perspective view of FIG. 3.

The barrier 11 has an acutely bent cross section when in its folded position, as shown in FIG. 2. The barrier comprises an upper part 15 which extends outwardly away from its line of attachment 13 on the structure 12 of the vehicle, to a sharply curved portion 17, from which a lower part 19 extends inwardly to terminate at a free edge 14. The upper part 15 of the barrier is strengthened by stiffening ribs 16 which may be integrally formed or molded with the upper part. The sharply curved portion 17 of the barrier is constructed so as to have sufficient resilience to return the barrier to its folded position when the vehicle is nonoperational. Stiffening ribs 18 are also included in the curved portion 17 to give it the required stiffness. The lower part 19 of the barrier 11 has tapering flutes 20 having their greatest depth at the free edge 14. The flutes 20 serve to enhance the flexibility of the lower part of the barrier. A web 21 of impermeable material is hingedly attached to the body of the vehicle at hinge line 22 and to the lower part 19 of the barrier 11 at hinge line 23.

In operation, pressurized air is fed from a lift fan (not shown), by way of orifices 24 in the vehicle structure 12, to the inside of the barrier 11. The plenum chamber formed by the barrier 11 and the web 21 will be filled with pressurized air and the action of the air pressure on that area of the lower part 19 which is within the plenum chamber, and on the web 21, will overcome the resilience of the sharply curved portion 17, so that the lower part 19 will move downwardly and outwardly as the vehicle rises on its cushion of pressurized air, and the barrier will assume a less acutely bent shape. Air will flow between the web 21 and the lower part 19 down the flutes 20 to feed the air cushion, as indicated by the arrows in FIG. 3. If required, additional supply ports (not shown), may be provided in the base of the vehicle to provide additional air to the cushion area. This may be particularly desirable when first forming the air cushion under the vehicle at the commencement of an operation.

When the vehicle ceases to operate and the lift fans are switched off, as the pressurized air forming the support cushion leaks away, the inherent resilience of the sharply curved portion 17 will pull the lower part 19 upwardly and the barrier will fold to its original nonoperational position.

Such a barrier can be advantageously constructed from composite materials. Such composite material may include as its reinforcing material, glass fibers, woven glass cloth, carbon fibers, boron fibers or other similar reinforcing materials. The reinforcing material is impregnated with suitable material in specific areas of the the region in order to give each part of the barrier the properties required. For example, if the reinforcing material of the barrier is woven glass cloth, the upper part 15 of the barrier is impregnated with polyester resin to give this part of the barrier high stiffness, and the stiffness of this part of the barrier is increased by integrally molded stiffening ribs 16. The barrier is formed in its folded configuration, and the woven glass cloth around the sharply curved portion 17 is impregnated with a two-part self-vulcanizing liquid "neoprene" solution, to give this part of the barrier the necessary flexible and resilient properties. The resilient properties of this portion are very important to the efficient operation of the barrier, and they may be enhanced by the insertion of spring steel strip or wire, having suitable form and properties, between the layers of glass cloth. The woven glass cloth at the lower part of the barrier is impregnated with epoxy resin which has good water-resistant properties, and in the region of the free edge 14 the epoxy resin may be blended with a polysulphide to give greater flexibility. Alternatively, this region of the lower part may be impregnated with self-vulcanizing liquid "neoprene" or other similar rubber solution, to give the flexible properties required. The lower part is also molded with tapering flutes 20 to improve the flexibility, the flutes tapering so that they have their greatest depth at the free edge. The web 21 may also be manufactured from woven glass cloth impregnated with epoxy resin, the web being attached to the vehicle and to the lower part of the barrier by suitable hinge means. When the web is made of rigid construction it will also be necessary to hingedly connect the upper part of the barrier to the vehicle to enable the barrier to extend from and return to its folded position at the commencement or cessation of vehicle operations.

It will be appreciated by those skilled in the art of air cushion vehicles that because the lower part 19 of the barrier 11 is subjected to the greatest amount of wear and damage, it is preferable to make this part of the barrier detachable from the sharply curved portion 17.

Those skilled in the art of reinforced plastics and other similar composite materials will appreciate that there are many well known manufacturing processes which could be used in the construction of a barrier, as hereinbefore described. It will also be appreciated that, while the method of laying up the reinforcing material and the composition of the resins used for impregnation is mainly governed by the properties required from any specific part of the completed barrier, the composition of the resins used will also be dependent on the reinforcing material being used, and the method of laying up the reinforcing material will be dependent on both the type of reinforcing material and the method of manufacture being used.

In another embodiment of the invention illustrated in FIG. 4, the barrier is shown in its extended position by full lines, and in an intermediate position beteen the extended and retracted positions by dashed lines. The upper part 27 of the barrier is attached to rigid structure 12 of an air cushion vehicle by suitable hinge means 28. In the extended position of the barrier, the upper part 27 extends outwardly and downwardly from its line of attachment on the vehicle structure to its outer edge 29, which is attached to a reentrant part 30 having hinge means 31. A lower part 32, as at its upper edge 33 to the reentrant part 30, extends downwardly and inwardly to terminate at a free edge 34. Resilient means 35, shown in FIG. 4 as a spring, are attached to the upper part 27 and the lower part 32.

In operation, the barrier is held in its extended position, where it substantially prevents the escape of pressurized air from the cushion area 25, by the action of the cushion air pressure on the inside surface of the lower part 32. When the vehicle ceases to operate and the cushion air leaks away, the resilient means 35 folds the lower part 32 upwardly towards the upper part 27, hinging taking place between the two parts by the hinge means 31 of the reentrant part 30.

FIG. 5 shows an alternative form of the embodiment of the invention illustrated in FIG. 4. The upper part 36 of the barrier extends downwardly from rigid attachment to struts 37, represented by chain lines, which extend outwardly from the rigid structure 12. The lower part 38 of the barrier is attached to the upper part 36 by hinge means 39, and in the operational position, as illustrated by the full line, extends downwardly to terminate at a free edge 40, in which position it acts as a barrier to the escape of pressurized air from the cushion area 25. Resilient means 41 are connected between the upper part 36 and the lower part 38, and these resilient means serve to fold the lower part upwardly when the vehicle is not air cushion supported. The lower part is shown intermediate the extended and retracted positions by dashed lines.

The upper part 36 may form an integral extension of the outer skin of the vehicle.

In operation, pressurized air is fed from the lift fan (not shown) and passes downwardly to the cushion area 25 through the duct formed between the rigid structure 12 and the upper part 36, so that it flows over the struts 37, as shown by the arrow in FIG. 5.

In the embodiments illustrated in FIGS. 4 and 5, no web members have been shown extending between the rigid structure and the lower part of the barrier to limit downward and outward movement of the free edge of the lower part. Such web members could be included in these embodiments. Alternatively, the resilient means may be designed such that they allow the lower part of the barrier to extend only to the required position under the action of the loading exerted on the lower part by the operational cushion pressure.

The construction of the upper and lower parts of the barriers described with reference to FIGS. 4 and 5 may be from composite materials as hereinbefore described with reference to the embodiment of FIGS. 1, 2 and 3. Similar means for imparting the necessary properties of flexibility or stiffness to the various parts of the barrier may be used, and the methods of construction would be the same as those already described.

In a further embodiment of the invention shown in FIG. 6, the barrier 42, illustrated in its operational position by the full line, extends outwardly from its means of attachment 43 on the vehicle structure 12 and next curves downwardly and outwardly and then downwardly and inwardly to a substantially straight lower portion which terminates in a free edge 44.

In its natural configuration, as illustrated by the dashed line 45, the barrier has an acutely bent cross section. When pressurized air is supplied beneath the vehicle to form the supporting air cushion, the air pressure acting on the inner surface of the barrier is able to partly overcome the resilience of the barrier which extends downwardly and outwardly to its operational position, as illustrated by the full line, where it acts to constrain the air cushion and has a less acutely bent cross section. When the vehicle ceases to be operational, as the cushion pressure decreases, the barrier will return to its natural configuration. When the vehicle is not cushion supported it rests on support feet (not shown), and the lowest part of the barrier is arranged to just touch the ground so that pressurized air is prevented from escaping as the pressurized cushion is being built up under the vehicle at the commencement of an operation.

The barrier may be constructed of a single sheet of resilient material, but preferably will be constructed in two parts, the upper part of which extends over length "A," being attached by suitable means to the lower part which extends over the length "B."

In the case of the barrier being built in two parts, that part which extends over length "A" will be of high resilience such that it will return to its more acutely bent shape when the barrier is not subjected to cushion pressure. In one form this part of the barrier may be manufactured from thin steel sheet rolled to suitable form and hardened and tempered to produce the required resilient properties. Alternatively, it may be made from composite materials and be so constructed as to have the required resilient properties, which may include the insertion of spring steel strip or wire in the composite material.

The lower part of the barrier which extends over the length "B" will be of sufficient stiffness in its upper area, where it is attached to the upper part of the barrier, to resist the effect of the cushion pressure. Its attachment to inherent upper part will have sufficient strength to transfer the loading on the lower part due to the cushion pressure into the upper part to help in overcoming the inherent resilience of the upper part, so that the barrier can extend to its operational position. At the same time that part of the barrier in the region of the free edge 44 will have adequate flexibility to enable it to pass over obstacles and confrom to the surface over which the vehicle is operating. Methods of constructing the lower part of the barrier to have these characteristics have previously been described in conjunction with the embodiment shown in FIGS. 1, 2 and 3.

Although a barrier in any embodiment hereinbefore described with reference to the accompanying drawings may be constructed as one unbroken peripheral unit, it is preferable, particularly in the case of large vehicles, to construct the barrier in a number of sections which are joined together around the periphery of the vehicle in an airtight manner.

Any of these barriers may be used around only part of the periphery of the vehicle and can be used in conjunction with other forms of flexible barrier or skirt assembly.

I claim as my invention:

1. A barrier for bounding at least part of the periphery of the cushion area of an air cushion vehicle, the barrier being constructed at least in part from composite materials so as to have an acutely bent normal cross section comprising an upper part constructed to have high stiffness and a lower part constructed to have high flexibility at least in the region of its free edge, connected by a normally sharply curved part to have high resilience, the free edge of the upper part being adapted for attachment to the rigid structure of the vehicle, the barrier construction being such that when it is so attached to a nonoperational vehicle the upper part of the barrier extends outwardly with respect to the vehicle, to merge with the sharply curved part which curves first downwardly and then inwardly to merge with the lower portion which then extends inwardly with respect to the vehicle, to terminate in a free edge, and when the vehicle becomes operational the action of the air cushion pressure on the barrier overcomes the resilience of the sharply curved part and moves the free edge of the lower part downwardly and outwardly in opposition to the normally sharply curved configuration of said resilient part, the resilience of the sharply curved part being enhanced by the insertion of spring steel strip and being sufficient to return the barrier to its original more acute configuration when it ceases to be acted upon by the air pressure.

2. A barrier for bounding at least part of the periphery of the cushion area of an air cushion vehicle, the barrier being constructed at least in part from composite materials so as to have an acutely bent normal cross section comprising an upper part constructed to have high stiffness and a lower part constructed to have high flexibility at least in the region of its free edge, connected by a normally sharply curved part constructed to have high resilience, the free edge of the upper part being adapted for attachment to the rigid structure of the vehicle, the barrier construction being such that when it is so attached to a nonoperational vehicle the upper part of the barrier extends outwardly with respect to the vehicle, to merge with the sharply curved part which curves first downwardly and then inwardly to merge with the lower portion which then extends inwardly with respect to the vehicle, to terminate in a free edge, and when the vehicle becomes operational the action of the air cushion pressure on the barrier overcomes the resilience of the sharply curved part and moves the free edge of the lower part downwardly and outwardly in opposition to the normally sharply curved configuration of said resilient part, the resilience of the sharply curved part being enhanced by the insertion of spring steel wire and being sufficient to return the barrier to its original more acute configuration when it ceases to be acted upon by the air pressure.